United States Patent
Luo

(10) Patent No.: US 10,867,176 B1
(45) Date of Patent: *Dec. 15, 2020

(54) VIRTUAL DETECTION SYSTEM

(71) Applicant: Lesoft Technology (Beijing) Co., LTD., Beijing (CN)

(72) Inventor: Wei Luo, Shenzhen (CN)

(73) Assignee: LESOFT TECHNOLOGY (BEIJING) CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/729,474

(22) Filed: Dec. 29, 2019

(30) Foreign Application Priority Data

Dec. 24, 2019 (CN) .......................... 2019 1 1343388

(51) Int. Cl.
| | | |
|---|---|---|
| G06K 9/00 | (2006.01) | |
| G06K 9/46 | (2006.01) | |
| G06K 9/40 | (2006.01) | |
| G06T 19/00 | (2011.01) | |
| G06K 9/62 | (2006.01) | |

(52) U.S. Cl.
CPC .......... *G06K 9/00624* (2013.01); *G06K 9/40* (2013.01); *G06K 9/4609* (2013.01); *G06K 9/6201* (2013.01); *G06T 19/003* (2013.01)

(58) Field of Classification Search
CPC .... G06K 9/00624; G06K 9/40; G06K 9/4609; G06K 9/6201; G06F 3/011; G06T 7/00; G06T 11/00; G06T 19/003; G06T 19/006
USPC ....................................................... 345/581
See application file for complete search history.

(56) References Cited

U.S. PATENT DOCUMENTS

| | | | | |
|---|---|---|---|---|
| 2009/0041302 | A1* | 2/2009 | Nagaoka ............ | G06K 9/00369 382/103 |
| 2014/0028850 | A1* | 1/2014 | Keating .................. | G06T 7/246 348/158 |
| 2015/0046483 | A1* | 2/2015 | Liu ....................... | G06K 9/6215 707/758 |
| 2016/0004920 | A1* | 1/2016 | Armstrong-Crews ...................... G03B 35/00 348/46 |
| 2016/0357187 | A1* | 12/2016 | Ansari .................. | G01S 13/862 |
| 2017/0249491 | A1* | 8/2017 | MacIntosh .......... | G06K 7/10861 |
| 2018/0018770 | A1* | 1/2018 | Hu ............................ | G06T 7/97 |
| 2018/0315221 | A1* | 11/2018 | Jones .................. | G06F 16/5838 |
| 2019/0116350 | A1* | 4/2019 | Goto ..................... | A63F 13/213 |
| 2019/0272673 | A1* | 9/2019 | Mathur .................. | G06T 15/20 |
| 2020/0020162 | A1* | 1/2020 | Jones ..................... | G06F 3/011 |

(Continued)

*Primary Examiner* — Sae Won Yoon
(74) *Attorney, Agent, or Firm* — Cheng-Ju Chiang

(57) ABSTRACT

Disclosed is a virtual detection system, wherein, with each processing module, by converting infrared detection images of each direction collected at each sampling point into a virtual detection space for automatically roaming in the virtual detection space to simulate a detection scene, the decision-makers can directly understand the actual situation of the target environment through the simulated virtual detection space without entering the scene, thereby making scientific decisions and reducing the probability of decision errors. And, in the disclosure, images can be acquired through infrared detectors, even for dim environments such as smoke and dust. Further, in the disclosure, it is only necessary to set an infrared detector at the sampling points of the detection path by a robot to collect the images, without the need for a detection personnel to enter or stay for a long time.

6 Claims, 4 Drawing Sheets

(56) References Cited

U.S. PATENT DOCUMENTS

2020/0175842 A1* 6/2020 Merjanian ............... G06T 11/60
2020/0228836 A1* 7/2020 Schwarz .............. H04N 13/371

* cited by examiner

| Non-coincidence portion of image A | Coincidence portion between images A and B | Non-coincidence portion of image B |

VIRTUAL DETECTION SYSTEM

TECHNICAL FIELD

The disclosure relates to the technical field of environmental detection, in particular, to a virtual detection system for dim environment.

BACKGROUND

In the field detection, rescue, remote command, etc., the target environment is often required for detection, so as to understand the actual situation of the target environment and develop a targeted plan. However, the target environment is usually dim, and the detection personnel should not or cannot stay for a long time. In the prior art, the hand-held lighting equipment is manually used to enter the target environment for detection, but for dim environments with smoke, dust, etc., even the detection personnel who enters cannot clearly see the conditions of the target environment. Further, since only the incoming detection personnel knows the conditions of the target environment best and decision makers only have knowledge of the target environment that is often limited to the verbal description from the detection personnel, thereby leading large errors in decisions made by the decision makers.

SUMMARY

The technical problem to be solved by the disclosure is to provide a virtual detection system, which may reproduce the actual conditions of the target environment through simulation, so that decision makers may understand the actual conditions of the target environment intuitively for making scientific decisions.

In order to solve the technical problem, the disclosure adopts the following technical solution:

A virtual detection system, including:

an infrared detector processing module, configured to collect infrared detection images of front, back, left, and right directions at each sampling point of detection path;

a DOG scale-space processing module, configured to convert the infrared detection image of each direction collected at respective sampling point to a DOG scale-space corresponding to each direction;

a key point detection process module, configured to detect a key point of the DOG scale-space of each direction;

a feature vector establishment processing module, configured to establish a feature vector of the key point according to a position and a reference direction of the key point;

a key point match processing module, configured to calculate a Euclidean distance between each key point according to respective feature vector of each key point to obtain a matched key point;

a coincidence region determination processing module, configured to determine a coincidence region between infrared detection images of the four directions collected at each sampling point according to the matched key point;

a combination processing module, configured to combine infrared detection images of the four directions collected at each sampling point into a virtual detection image of sampling points according to the coincidence region;

a virtual detection space conversion processing module, configured to convert the virtual detection image of each sampling point into a virtual detection space;

an automatic roaming processing module, configured to automatically roam in the virtual detection space to simulate a detection scene.

Compared with the prior art, the disclosure has the following beneficial effects:

In the virtual detection system of the disclosure, with each processing module, by converting infrared detection images of each direction collected at each sampling point into a virtual detection space for automatically roaming in the virtual detection space to simulate a detection scene, the decision-makers can directly understand the actual situation of the target environment through the simulated virtual detection space without entering the scene, thereby making scientific decisions and reducing the probability of decision errors. And, in the disclosure, images can be acquired through infrared detectors, even for dim environments such as smoke and dust. Further, in the disclosure, it is only necessary to set an infrared detector at the sampling points of the detection path by a robot to collect the images, without the need for detection personnel to enter or stay for a long time, so that the disclosure can be applied to a variety of complex detection environments.

DETAILED DESCRIPTION

Figure 1:
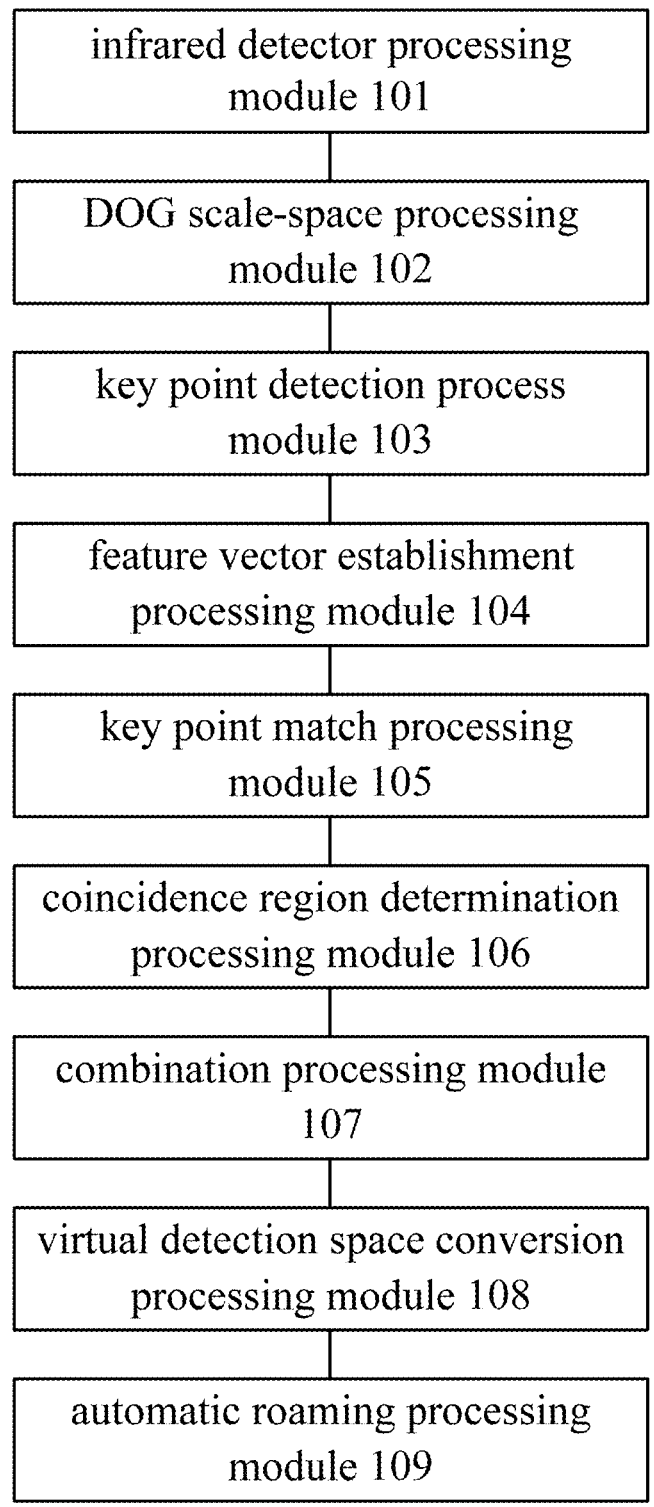
FIG. 1 is a block view of a first specific embodiment of a virtual detection system of the disclosure.
Figures 2, 3:
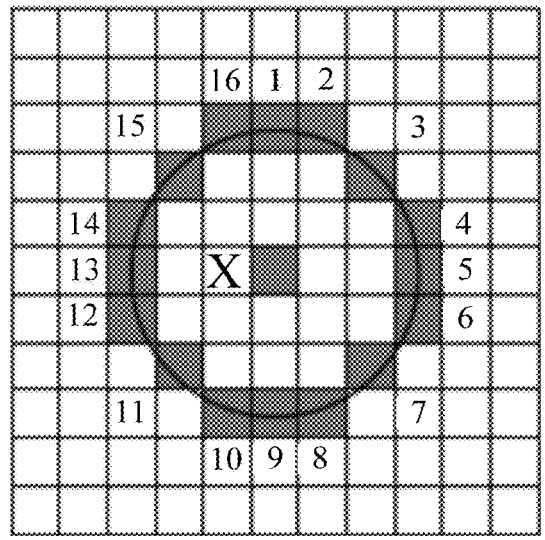
FIG. 2 is a view showing a specific embodiment of detection of a key point in a virtual detection system of the disclosure.
FIG. 3 is a view showing a specific embodiment of a coincidence region in a virtual detection system of the disclosure.

With reference to FIG. 1, a block view of a first specific embodiment of a virtual detection system of the disclosure is illustrated. The system of the present embodiment mainly includes the following processing modules: an infrared detector processing module 101, a DOG scale-space processing module 102, a key point detection process module 103, a feature vector establishment processing module 104, a key point match processing module 105, a coincidence region determination processing module 106, a combination processing module 107, a virtual detection space conversion processing module 108 and an automatic roaming processing module 109, which are specifically described as follows:

in the present embodiment, first determining a detection path based on passage conditions of the detected dim environment, specifically, for example, if a person should be rescued in a fired house and the target environment is a plurality of dim rooms, passage conditions may be determined based on the architectural design of the room, and the center line of the passage is determined as the detection path according to the passage conditions, so that the scope of the image collected by the detection path designed in this way is better, and in practice, the detection path may also be adjusted according to the detection purpose, which is not specifically limited here, and the passage conditions may be determined according to the actual situation, for example, if the target environment is a road, the detection path may be determined according to the road conditions in the map, while for some unknown target environments, the detection path may be also adjusted at any time during actual detection for recording and saving the detection path, which is not described here again;

in the present embodiment, the infrared detector processing module 101 is mainly configured to collect infrared detection images of the front, back, left, and right directions at each sampling point of the detection path; specifically, the infrared detector may be fixed at the sampling point by a detection robot or the infrared detector travels with the detection robot to collect images through the infrared detector when passing through the sampling point, and optionally, the infrared detector may be also manually disposed at the sampling point while evacuating the personnel after the disposition, which is not specifically limited here;

the DOG scale-space processing module 102 is mainly configured to convert the infrared detection image of each direction collected at respective sampling point to a DOG scale-space corresponding to each direction; specifically, there is at least one infrared detection image in each direction, and for each of the infrared detection images, in a specific embodiment, first Laplacian of Gaussian is performed on the infrared detection image to obtain a Laplacian of Gaussian image, then the Laplacian of Gaussian image is subtracted from its adjacent image, so as to obtain the DOG (Difference of Gaussian) scale-space;

the key point detection process module 103 is mainly configured to detect a key point of the DOG scale-space of each direction; specifically, the existing method for detecting the key point is to treat a point as the detection point, and then to compare a total of 26 points, i.e., points around the point and 9 points in the upper layer and 9 points in the lower layer other than 8 points surrounded in the same layer, with the detection point, but the amount of computer calculation is large and time consuming when the above method is adopted. To this end, as shown in FIG. 2, according to a preferred embodiment of the disclosure, the key point detection process module 103 may detect the key point by the following methods:

first, selecting any pixel point in the DOG scale-space as a starting detection point;

then, using the starting detection point to make a circle with a radius of 3 pixels;

finally, determining a gray difference between the starting detection point and the pixels on a circumference numbered 1, 5, 9 and 13, determining the starting detection point as a candidate key point if a difference between the starting detection point and at least three of 1, 5, 9, and 13 is greater than a preset threshold, and then continuing the detection of the next detection point until all the pixels are detected to obtain all the key points. In the present embodiment, there is no need to compare the X point with 26 points as in the prior art, the calculation amount is greatly reduced, and the detection efficiency may be improved. Further, for detected candidate key points, the candidate key points may also be screened, and since the edge region has a sudden change in gray value in the vertical direction, it will be mistaken for a key point, so the key point detection process module 103 should remove an edge response point from the candidate key points in the present embodiment in order to improve the stability of image matching;

the feature vector establishment processing module 104 is mainly configured to establish a feature vector of the key point according to a position and a reference direction of the key point; specifically, for determined key points, the key points should be positioned to determine positions, such as performing three-dimensional quadratic function fitting to the determined key points so as to accurately determine the positions of the key points, and further, for determined key points, a reference direction should be assigned to the key points, which is specifically performed by assigning a reference direction to the key points based on the gradient direction of neighboring pixels, i.e., using histograms to count the gradients and amplitudes of pixels in the neighborhood, wherein the gradient direction angle is the horizontal axis scale, and the horizontal axis has 8 scales if 45 degrees is taken as a unit; the vertical axis is the cumulative value of the amplitude of the corresponding gradient, and the direction with the highest amplitude is taken as the reference direction to ensure the rotation invariance of the key points; finally, the feature vector of the key point is established, that is, a 16×16 window can be taken as the center of the key point, and the gradient direction histograms of 8 directions are calculated on the 4×4 window respectively, and a cumulative value of each gradient direction is drawn to form a seed point, each seed point having gradient intensity information in 8 directions; since there are 4×4 (Bp×Bp) subregions, there are 4×4×8=128 data in total, and a 128-dimensional feature vector corresponding to the key point is finally established;

the key point match processing module 105 is mainly configured to calculate an Euclidean distance between each key point according to respective feature vector of each key point to obtain a matched key point; specifically, the Euclidean Distance is the actual distance between two points in n-dimensional space, and in the present embodiment, the similarity of images is calculated using the Euclidean distance, wherein the smaller the Euclidean distance between two key points is, the greater the similarity is, then it is confirmed that the two key points are matching key points, which will not be repeated here;

the coincidence region determination processing module 106 is mainly configured to determine a coincidence region between infrared detection images of the four directions collected at each sampling point according to the matched key point; specifically, through the matching key points determined in the above step, the coincidence region determination processing module 106 may further determine that the region where the matching key points are located is the coincident region between the images, for example, the coincidence region of the image A and the image B in the two directions is shown in FIG. 3, and the coincidence regions between the images A and B and images of other directions may also be determined according to the matching key points, which will not be repeated here;

the combination processing module 107 is mainly configured to combine infrared detection images of the four directions collected at each sampling point into a virtual detection image of sampling points according to the coincidence region; specifically, since the coincidence regions between the images have been determined, the images in the four directions are combined into a panoramic image according to the coincidence regions, i.e., slicing the infrared detection images in four directions into a cylindrical shape centered on the viewpoint, so that a 360-degree look around the horizon may be achieved, and in the present embodiment, there are at least four images in the four directions and a panoramic image may be obtained by slicing the images in the four directions according to the coincidence regions, and then the panoramic image is used as a virtual detection image of the sampling point;

the virtual detection space conversion processing module 108 is mainly configured to convert the virtual detection image of each sampling point into a virtual detection space;

specifically, the step may be achieved by a virtual reality editor, and as an embodiment, for example, the virtual detection image of each sampling point may be used as a node of a map structure, and each node may establish a link relationship with other nodes to form the map structure, then viewers may roam between any two nodes with a link relationship;

the automatic roaming processing module 109 is mainly configured to automatically roam in the virtual detection space to simulate a detection scene; specifically, for example, since in above viewers may roam between any two nodes with a link relationship, a decision maker in the disclosure may automatically watch through the virtual detection space for intuitively understanding the conditions of the target environment, and further, although it is possible to roam between two nodes in the present embodiment, preferably, the automatic roaming processing module 109 may determine an automatic roaming path corresponding to the detection path according to the detection path in order to be the same as the actual detection conditions, so that the virtual detection space displayed by automatic roaming may correspond to the real detection scene.

Figure 4:
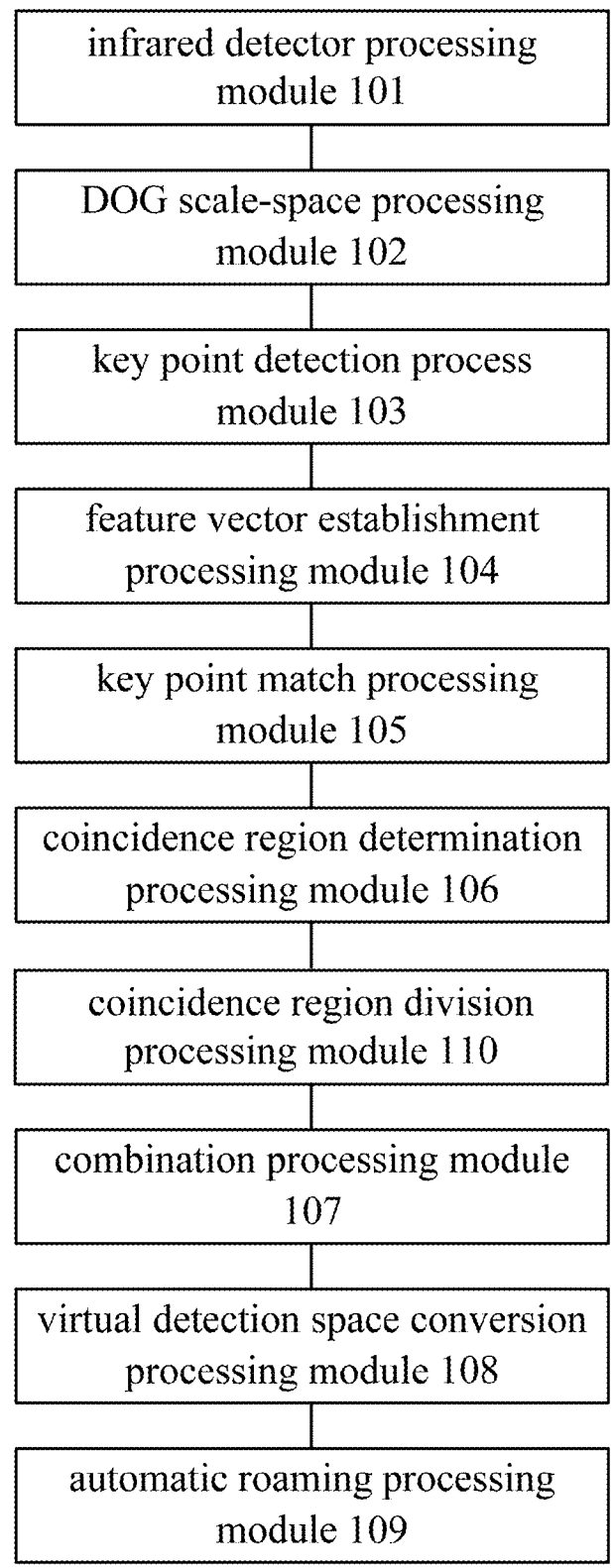
FIG. 4 is a block view of a second specific embodiment of a virtual detection system of the disclosure.

It should be noted that in the above embodiment, for the combined virtual detection image, seams may occur in the coincidence region and ghosting problems will occur as multiple images are sliced together. In order to solve the technical problem, in the prior art, a seamless combined image is obtained by adjusting the brightness of the combined image to reduce the effect of seams and performing weighted average fusion for the coincidence region. However, in the disclosure, the infrared detection image is not sensitive to visible light, and the image will be distorted by brightness adjustment. Therefore, with reference to FIG. 4, the second specific embodiment of the virtual detection system of the disclosure differs from the above first embodiment in that the virtual detection system of the disclosure further includes: a coincidence region division processing module 110, configured to: divide the coincidence region into a seam region and an adjacency region; determine a seam line in the seam region, for example, by determining a seam line by optimal seam algorithm; generate a mask image of the seam region according to the determined seam line; fuse the seam region according to a first fusion algorithm that is, for example, a multi-resolution image fusion algorithm, and use a second fusion algorithm to fuse the adjacency region. In the present embodiment, the multi-resolution image fusion algorithm is used to fuse the seam region, so that fusion of non-strict coincidence regions may be achieved to eliminate seams for combining into high-quality images, and the second algorithm uses a weighted average image fusion algorithm, which may effectively remove seams in adjacent areas, so the present embodiment may effectively eliminate seams for coincidence regions and avoid ghosting problems on the whole.

Figure 5:
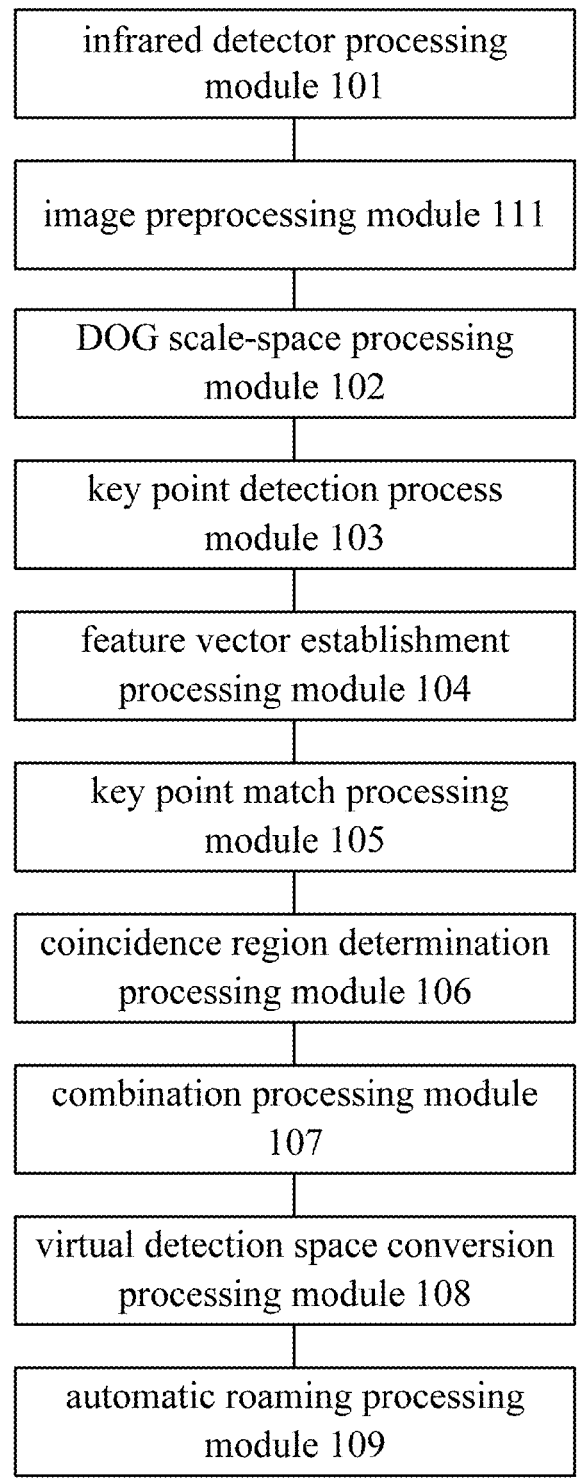
FIG. 5 is a block view of a third specific embodiment of a virtual detection system of the disclosure.

In addition, the collected infrared detection images often have clutter noise, etc. If the noise is not removed, inaccurate simulation results will emerge later. As a preferred embodiment, with reference to FIG. 5, the present embodiment is different from the foregoing embodiment in that it further includes: an image preprocessing module 111, configured to pre-process the collected infrared detection images to remove clutter noise; specifically, for example, the image preprocessing module 111 pre-processes the collected infrared detection images to divide the collected infrared detection images into visual saliency tiles and non-visual saliency tiles, and an algorithm that removes noise better is used for visual saliency tiles, such as Non-Local Means (NL-Means) while an algorithm that quickly remove noise for the non-visual saliency tiles, such as the mean filtering algorithm, so that on the one hand noises may be effectively removed for useful information, and on the other hand the denoising efficiency may be improved, which is not repeated here.

The foregoing is only preferred exemplary embodiments of the present invention and is not intended to be limiting of the present invention, and any modifications, equivalent substitutions, improvements and the like within the spirit and principles of the present invention are intended to be embraced by the protection range of the present invention.

What is claimed is:

1. A virtual detection system, comprising:
a processor;
a memory comprising instructions that, when executed by the processor, cause the virtual detection system to:
collect infrared detection images of front, back, left, and right directions at each sampling point of detection path;
convert the infrared detection image of each direction collected at respective sampling point to a Difference of Gaussian (DOG) scale-space corresponding to each direction;
detect a key point of the DOG scale-space of each direction;
establish a feature vector of the key point according to a position and a reference direction of the key point;
calculate a Euclidean distance between each key point according to respective feature vector of each key point to obtain a matched key point;
determine a coincidence region between infrared detection images of the four directions collected at each sampling point according to the matched key point;
combine infrared detection images of the four directions collected at each sampling point into a virtual detection image of sampling points according to the coincidence region;
convert the virtual detection image of each sampling point into a virtual detection space;
automatically roam in the virtual detection space to simulate a detection scene.

2. The system of claim 1, wherein the instructions, when executed by the processor, further cause the virtual detection system to determine an automatic roaming path corresponding to the detection path according to the detection path.

3. The system of claim 1, wherein the instructions, when executed by the processor, further cause the virtual detection system to detect the key point of the DOG scale-space of each direction by:
selecting any pixel point in the DOG scale-space as a starting detection point;
using the starting detection point to make a circle with a radius of 3 pixels;
determining a gray difference between the starting detection point and the pixels on a circumference numbered 1, 5, 9 and 13, determining the starting detection point as a candidate key point if a difference between the starting detection point and at least three of 1, 5, 9, and 13 is greater than a preset threshold, and then continuing detection of next detection point until all the pixels are detected to obtain all key points.

4. The system of claim 3, wherein the instructions, when executed by the processor, further cause the virtual detection system to screen the candidate key point to remove an edge response point.

5. The system of claim 1, wherein the instructions, when executed by the processor, further cause the virtual detection system to: divide the coincidence region into a seam region and an adjacency region; determine a seam line in the seam region; generate a mask image of the seam region according to the determined seam line; fuse the seam region according to a first fusion algorithm, and use a second fusion algorithm to fuse the adjacency region.

6. The system of claim 1, wherein the instructions, when executed by the processor, further cause the virtual detection system to preprocess the collected infrared detection images to remove clutter noise.

\* \* \* \* \*